Dec. 2, 1941.    G. T. PEARCE    2,264,548
MINERAL WOOL FORMING APPARATUS
Original Filed Sept. 3, 1937
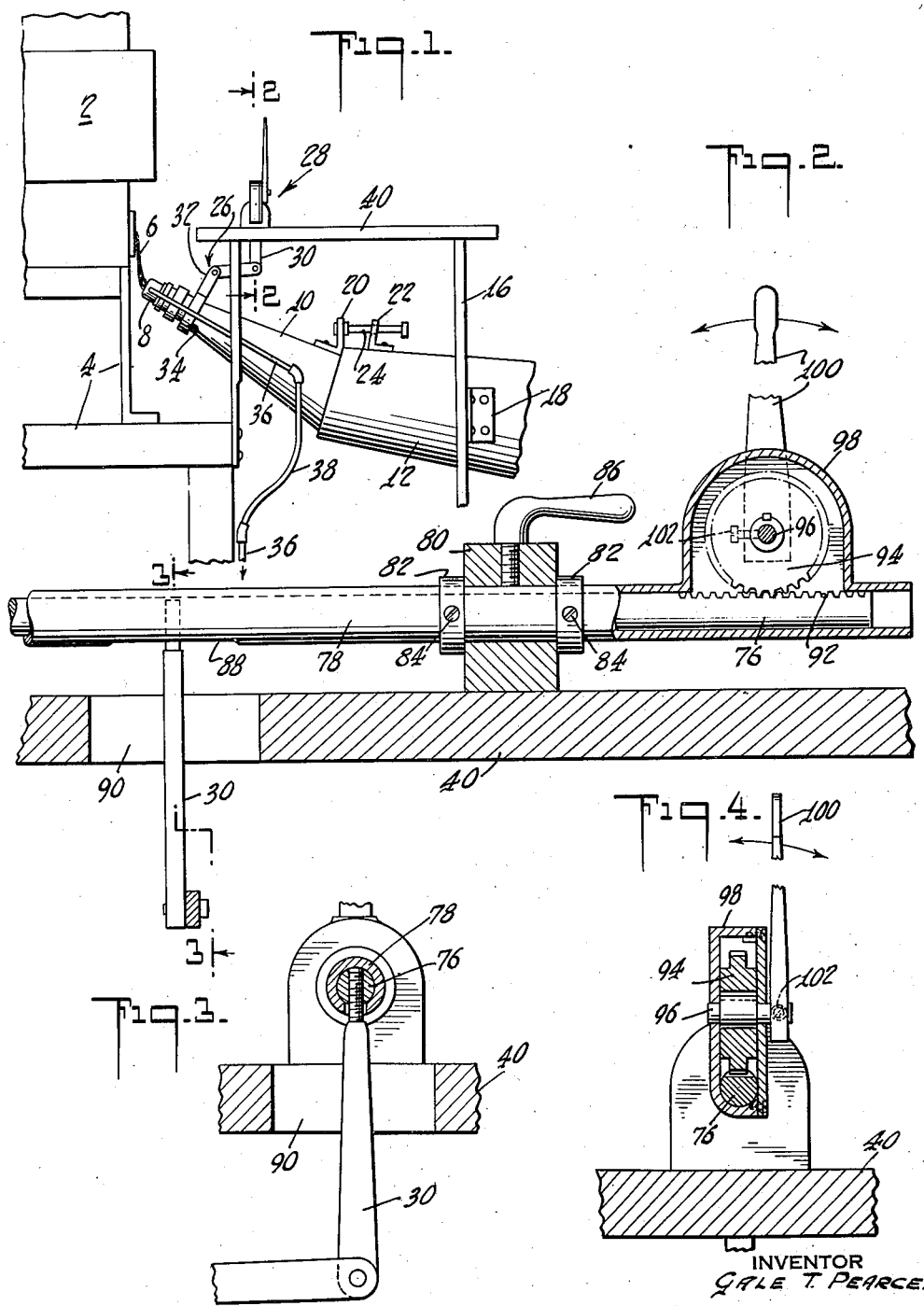
INVENTOR
GALE T. PEARCE.
BY Virgil C. Kline
ATTORNEY Patented Dec. 2, 1941

2,264,548

UNITED STATES PATENT OFFICE 2,264,548

MINERAL WOOL FORMING APPARATUS

Gale T. Pearce, Somerville, N. J., assignor to Johns-Manville Corporation, New York, N. Y., a corporation of New York Original application September 3, 1937, Serial No. 162,304. Divided and this application March 30, 1940, Serial No. 327,073. In Canada August 23, 1938

4 Claims. (Cl. 83—91)

The present invention relates to an apparatus for producing mineral wool, and more particularly, to improvements in the fiberizing nozzles of such apparatus and in their manner of operation, and is a division of copending application S. N. 162,304, filed September 3, 1937.

Conventionally, mineral wool is produced by melting a suitable raw material or a mixture of raw materials, such as natural rock or blast furnace slag, in a furnace such as a cupola and discharging the molten material in the form of a stream. The stream is blasted by a jet of fluid issuing from a nozzle at high velocity and is thereby converted into fibers, which are suspended in the fluid and directed to a suitable collecting means.

It is an object of the instant invention to provide a mineral wool forming apparatus which will produce a more complete fiberization of the stream of molten mineral wool forming material than has heretofore been obtainable.

A further object of the invention is the provision of means in an apparatus of the type referred to which will permit of ready and accurate adjustment of the fiberizing nozzle to follow the meander of the stream of molten material issuing from the mineral wool melting furnace.

Other objects and advantages, if not specifically pointed out, will be apparent to those skilled in the art from the following detailed description of what are now considered the preferred embodiments of the present invention.

In the drawing:

Fig. 1 is a side elevational view of an apparatus constructed in accordance with the present invention;

Fig. 2 is a fragmentary detail view on an enlarged scale and partially in section taken on the plane indicated by line 2—2 of Fig. 1;

Fig. 3 is a fragmentary sectional view taken substantially on the plane indicated by line 3—3 of Fig. 2; and Fig. 4 is a fragmentary sectional view taken substantially on the plane indicated by the line 4—4 of Fig. 3.

Referring now to the drawing, and particularly to Fig. 1, there is shown a furnace 2 for melting the raw mineral wool forming material, such as slag or rock or mixtures thereof. The furnace illustrated is of the cupola type, but it is understood that it may take many different forms, any one of which is equally as applicable to the present invention as the cupola shown. The cupola 2 may be supported by a suitable framework 4 at an elevated position. The molten material is discharged from the cupola in the form of a stream 6 and is fiberized by the action of a steam jet or the like issuing from a nozzle 8. The nozzle illustrated is of an aspirating type, in which the stream of molten material is drawn into the nozzle and surrounded by steam jets which act on the molten material to fiberize the same. However, as will be understood, the invention to be particularly described below is equally applicable for use with other types of nozzles.

Nozzle 8 is connected to a movable section 10 of a blow tube 12, which confines and directs the stream of newly formed fibres to a suitable collection apparatus (not shown). The blow tube 12 may be suitably attached to a frame 16 as by means of angle irons 18. The movable section 10 of the blow tube may be telescoped within the main body portion of the tube 12 and fit sufficiently loosely therein to enable it to be moved axially and angularly relatively to the main body portion. The loose connection between the movable section 10 and the main body of the blow tube is provided by angle iron 20 connected to the movable section 10 and an angle 22 connected to the fixed main body portion of the blow tube 12. A headed stud 24 is suitably anchored to the angle 20 and is passed through a suitable opening in angle 22. The head of the stud prevents complete separation of the movable section 10 from the main body portion, while permitting limited movement therebetween. The movable section 10 is supported at its upper end by a linkage 26 which connects it with an adjustment device 28. Steam or compressed air is supplied to the nozzle 8, carried by section 10 by means of a pipe line 36 having a flexible section 38.

The linkage 26 consists of an arm 30, which is connected to the adjustment device 28 in a manner hereinafter described, a collar 32 which is suitably clamped to the movable section 10, and a link 34 which connects the arm 30 and the collar 32. Adjustment device 28 is mounted on a platform 40 which is supported by the framework 16. The platform 40 provides a station for an operator who can observe the stream 6 and move the nozzle 8 and the movable section 10 so as to follow the meandering of the stream by means of the adjustment device 28, now to be particularly described.

The adjustment device is shown in detail in Figs. 2, 3, and 4. The arm 30, to which the link 34 is suitably articulated at one end, is suitably threaded at its opposite end and screwed into a threaded aperture in a shaft 76. The shaft 76 is carried within a sleeve 78, which is journaled in suitable bearing supports 80 and prevented from longitudinal movement therein by sleeves 82, connected to the sleeve 78 on each side of each support 80 by means such as set screws 84. A clamping screw 86 is threaded into support 80 and may be manipulated to hold the sleeve 78 in any adjusted position. Sleeve 78 is provided with a longitudinally extending opening 88, which is sufficiently wide to enable the threaded end of the arm 30 to pass therethrough and is of sufficient length to enable the arm 30 and the shaft 76 to move axially of the sleeve 78 for a limited distance. The arm 30 passes through an opening 90 provided in the platform 40.

The shaft 76 is provided at one end with teeth which form a rack 92 which meshes with a pinion 94 carried by a stud shaft 96 which is journaled in a housing 98 suitably connected to or formed integrally with the sleeve 78. The stud shaft 96 has a hand lever 100 attached thereto by suitable means such as a set screw 102.

In the operation of the adjustment device to adjust the position of the nozzle 8 in conformity with the meandering of the stream 6 of molten material, rotation of the hand lever 100 in either of the directions shown by the arrows in Fig. 2 causes the pinion 94 to be rotated, which, in turn, moves the rack 92 on the shaft 76 to cause endwise displacement of the shaft. The movement of the shaft 76 will cause the arm 30 to move longitudinally of the opening 88 within sleeve 78 and through the medium of the linkage 26 will cause the movable section 10 of the blow tube and nozzle 8 to be moved across the front of the cupola 2 to position the nozzle as desired.

Movement of the hand lever 100 in either of the directions indicated by the arrows shown in Fig. 4, after the clamping screw 86 has been loosened, will cause the sleeve 78 to rotate and, in turn, rotate the arm 30 through contact between the arm and the sides of the opening 88. Movement of arm 30 will cause the movable section 10 of the blow tube and nozzle 8 to be moved through the medium of linkage 26 towards and away from the cupola 2, as well as upwardly and downwardly as permitted by the loose connection between the movable section 10 and the main body 12 of the blow tube.

Thus, by the apparatus described, an operator on platform 40 can watch the stream of molten material 6 and through the adjustment device 28 just described, move the nozzle 8 and the attached movable section 10 so as to follow any meanderings of the stream 6.

The adjustment device may take other specific forms without departing from the scope of the present invention as defined by the subjoined claims, it being understood that the foregoing details have been given for the purpose of explanation and not limitation.

What I claim is:

1. An apparatus for producing mineral wool, comprising means for forming a stream of molten material, a blow tube including a movable section, a nozzle connected to the movable section of said blow tube for directing a blast of fluid in proximity to said stream to convert the molten material into fibres, and means for simultaneously adjusting the position of said nozzle and movable blow tube section, said means comprising a rack, linkage connecting said rack and movable section in a manner to transmit movements of said rack to said movable section, and means for longitudinally and laterally adjusting the position of said rack.

2. An apparatus for the production of mineral wool comprising a blow tube including a movable section and a stationary section, a nozzle connected to the movable section of said blow tube for directing a blast of fluid in proximity to a stream of molten mineral wool forming material to convert the molten material into fibres, and means for simultaneously adjusting the position of said nozzle and movable blow tube section relative to the meander of the stream and stationary section, said means comprising a member arranged for sliding and rotating movement and linkage connecting said member to said blow tube section.

3. A fiberizing means for use in the manufacture of mineral wool comprising a nozzle for directing a jet of gaseous fluid in proximity to a stream of molten mineral wool forming material for shredding the stream into fibres, a supply line for the gaseous material connected to said nozzle, and means for adjusting the position of said nozzle relatively to said stream of molten material, said means comprising a rack, linkage connecting the rack and nozzle in a manner to transmit movement of said rack to said nozzle, and means for adjusting the position of said rack.

4. A fiberizing means for use in the manufacture of mineral wool comprising a nozzle for directing a jet of gaseous fluid in proximity to a stream of molten mineral wool forming material for shredding the stream into fibres, a supply line for the gaseous material connected to said nozzle, and means for adjusting the position of said nozzle relatively to said stream of molten material, said means comprising a rack, linkage connecting said rack and nozzle, a rotatable sleeve surrounding said rack, and means carried by said sleeve to move said rack longitudinally and to rotate said sleeve and rack.

GALE T. PEARCE.